United States Patent [19]

Schweitzer, III

[11] Patent Number: 5,805,813
[45] Date of Patent: Sep. 8, 1998

[54] SYSTEM FOR VISUAL MONITORING OF OPERATIONAL INDICATORS IN AN ELECTRIC POWER SYSTEM

[75] Inventor: Edmund O. Schweitzer, III, Pullman, Wash.

[73] Assignee: Schweitzer Engineering Laboratories, Inc., Pullman, Wash.

[21] Appl. No.: 688,816

[22] Filed: Jul. 26, 1996

[51] Int. Cl.[6] .................................................. G08B 29/00
[52] U.S. Cl. ................. 395/200.47; 364/550; 348/142; 348/143; 348/175
[58] Field of Search .............................. 364/514 A, 550; 395/200.47; 348/142–143, 159, 174–175; 382/190, 203, 209, 218; 340/539, 506, 524, 637, 638, 825.29, 825.32, 825.06, 825.16, 825.17, 825.18, 500, 545, 556

[56] References Cited

U.S. PATENT DOCUMENTS

| | | | |
|---|---|---|---|
| 3,718,757 | 2/1973 | Gulitz et al. ............................. | 117/201 |
| 4,511,886 | 4/1985 | Rodriguez ................................ | 340/534 |
| 4,673,974 | 6/1987 | Ito et al. .................................. | 340/534 |
| 4,837,708 | 6/1989 | Wright ..................................... | 364/509 |
| 4,857,912 | 8/1989 | Everett, Jr. et al. ................... | 340/825.3 |
| 5,132,968 | 7/1992 | Cephus ..................................... | 340/539 |
| 5,382,943 | 1/1995 | Tanaka .................................... | 340/539 |

*Primary Examiner*—James P. Trammell
*Assistant Examiner*—Bryan Bui
*Attorney, Agent, or Firm*—Jensen & Puntigam, P.S.

[57] ABSTRACT

A visual monitoring system for an electric power substation includes at least one camera for obtaining the image of various operational indicators in the substation, either within the control house, outdoors or both. The indicators could be the status of various gauges, including current, voltage and temperature gauges, or other structural elements, such as the position of various switches, the level of oil in a transformer sight glass, or whether a transformer fan is running, among others. The image is then enhanced to accentuate the desired features, and the desired data is then image detected. The resulting information is then compared against a standard to determine whether or not the operational status of the indicator is abnormal.

27 Claims, 4 Drawing Sheets

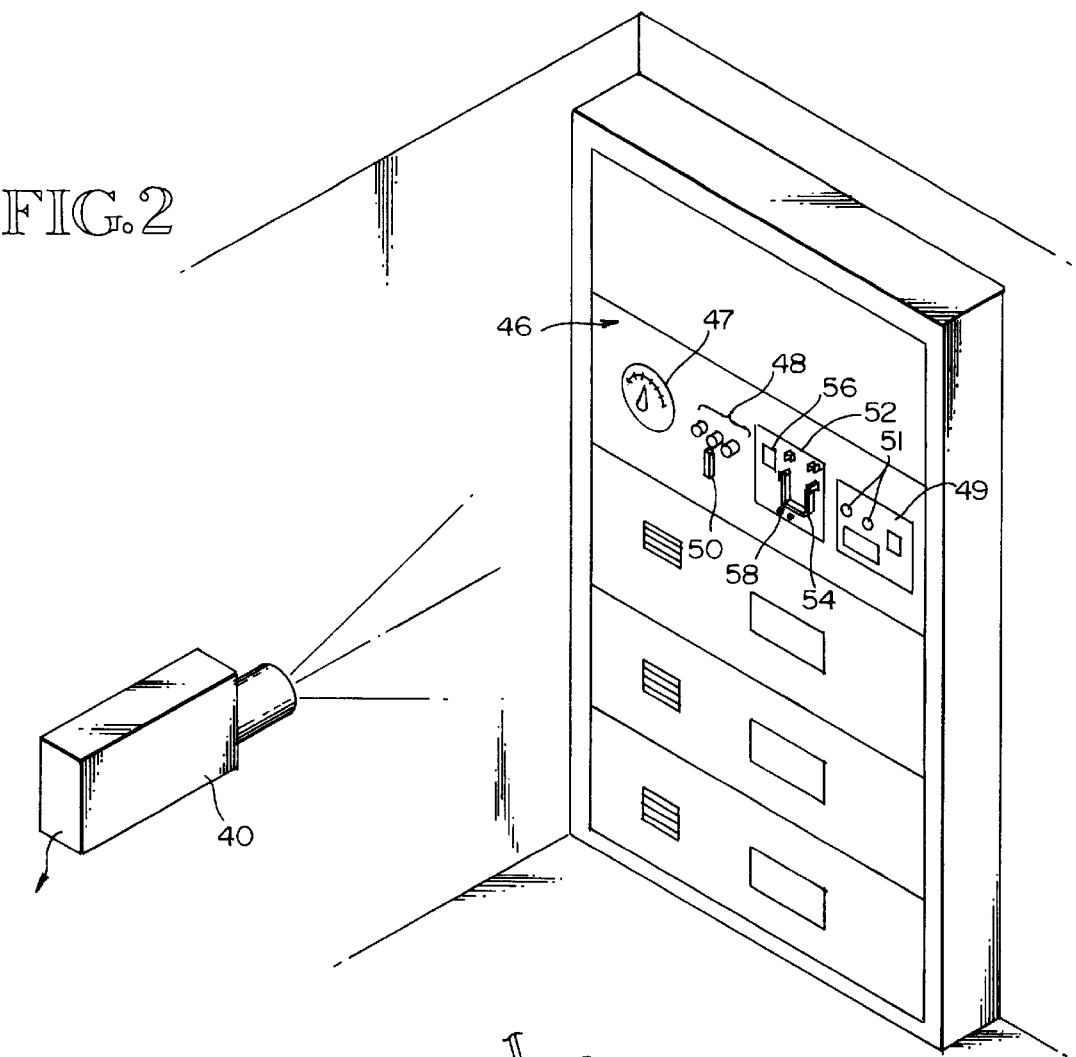
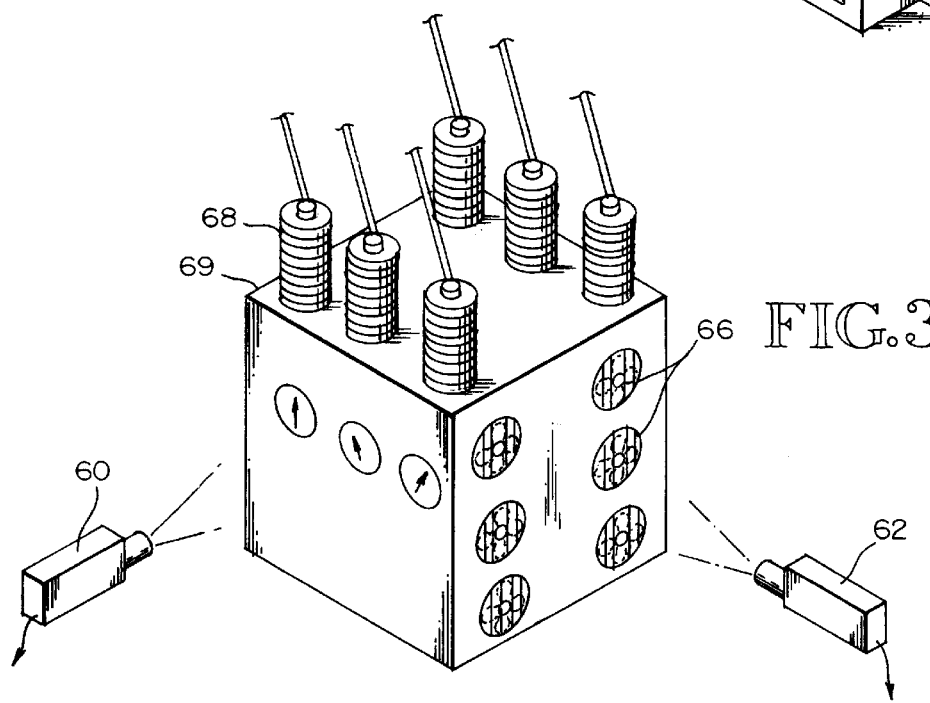

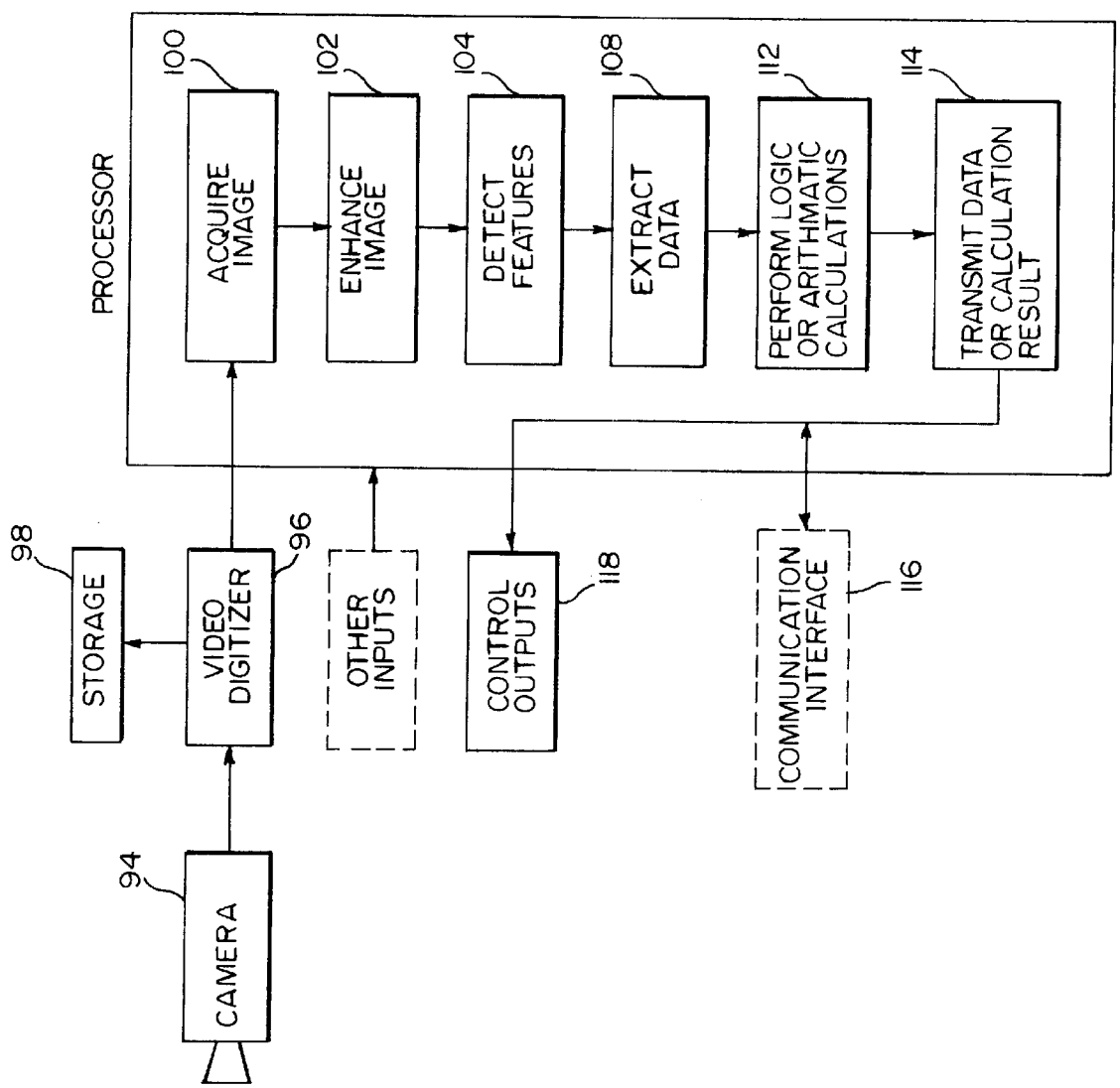

SYSTEM FOR VISUAL MONITORING OF OPERATIONAL INDICATORS IN AN ELECTRIC POWER SYSTEM

TECHNICAL FIELD

This invention relates generally to monitoring apparatus used in electric power systems, and more specifically concerns image monitoring and analysis of operational indicators present in an electric power substation or similar control apparatus for electric power.

BACKGROUND OF THE INVENTION

When the electric power industry was first established and initial power distribution systems developed, human operators monitored the various meters and gauges used in the system. In the event of an overload or fault within the system, as indicated by such meters and/or gauges, the operator would manually trip a circuit breaker, interrupting the flow of power until the particular problem causing the overload and/or fault was corrected.

As power systems grew and expanded, human operators were gradually replaced by automatic protection systems of varying sophistication. Later, automatic control systems were developed to control and integrate the operation of the automatic protection systems.

In automatic protection systems, an apparatus generally referred to as a relay was developed to compare actual line voltages and currents against preselected standard or normal values. If the measured values were not within the established tolerances, the appropriate circuit breakers were tripped by an electrical signal. For a long time, relays were structurally electromechanical and, while somewhat effective, were quite function-specific and limited in their capability and coverage. A large number of such relays was necessary to provide adequate coverage and protection. These electromechanical relays did, however, eliminate the need for human operators for the specific function covered by the relay. This eventually led to the "unmanned" substation. However, such relays still included so-called "targets", i.e. visual indicators, which were intended for operator viewing, so that an out-of-circuit condition determined by the relay could be recognized by the operator by an inspection of the front panel of the relay, where the target lights were located.

Digital relays have been a recent development in power system protection. Digital relays use computer (microprocessor) techniques to detect out-of-tolerance system conditions, and they are replacing the existing electromechanical relays. These microprocessor-based relays provide a substantial increase in coverage, flexibility and information concerning the particular overload or fault condition detected. In addition, sophisticated control systems have been developed to link such relays together to a central facility.

While digital relays still retain "target" visual indicators, such visual information is now typically of little direct use, since the relay provides a large volume of printed data concerning the power system conditions and any overload/fault existing on the line associated with the relay.

However, even the most sophisticated digital relay still uses measured voltage and currents from the power system line and converts those values to levels suitable for processing within the relay. Further, hard wire connections are still necessary from the relay outputs to follow-on devices such as switches, circuit breakers and other equipment.

In addition, there are many system indicators present at a power system substation which represent the status of various devices at the substation and/or particular aspects of the power system which are expensive, inconvenient and/or difficult to communicate electrically to a relay for processing. These indicators include, for example, temperature and pressure gauge data, and the actual physical condition of various equipment such as transformers, circuit breakers, capacitor banks, fans, etc. Even for conventional current and voltage measurements, the high voltages and/or isolation requirements of the measuring devices add significantly to the expense of those devices.

Hence, current monitoring systems using digital relays with measurement of actual voltage and currents on the power line actually use only a small number of the possible monitoring opportunities present in the typical substation. Even so, the trend in substation monitoring is toward faster and more sophisticated processing of measured voltages and currents, rather than making use of other system condition indicators present in the substation, both in the control house and outdoors.

In the present invention, however, monitoring of the operation of a substation includes information obtained from a substantially wider array of various existing system indicators at the substation, at the same time taking advantage of digital processing technology.

DISCLOSURE OF THE INVENTION

Accordingly, the present invention is a system for visually monitoring the state of various operational indicators present in an electric power control or monitoring environment, comprising: means for obtaining an image of the status of a plurality of operational indicators in said electric power environment; means for processing that obtained image to enhance recognition of the status of the indicators; and means for comparing the processed image to a preselected standard to determine the state of the indicator.

BRIEF DESCRIPTION OF THE DRAWINGS

FIG. 2 is a diagram showing indoor monitoring functions of the present invention.

FIG. 3 is a diagram showing one aspect of outdoor monitoring functions of the present invention.

FIG. 6 is a block diagram of the processing steps of the present invention.

BEST MODE FOR CARRYING OUT THE INVENTION

Figure 1:
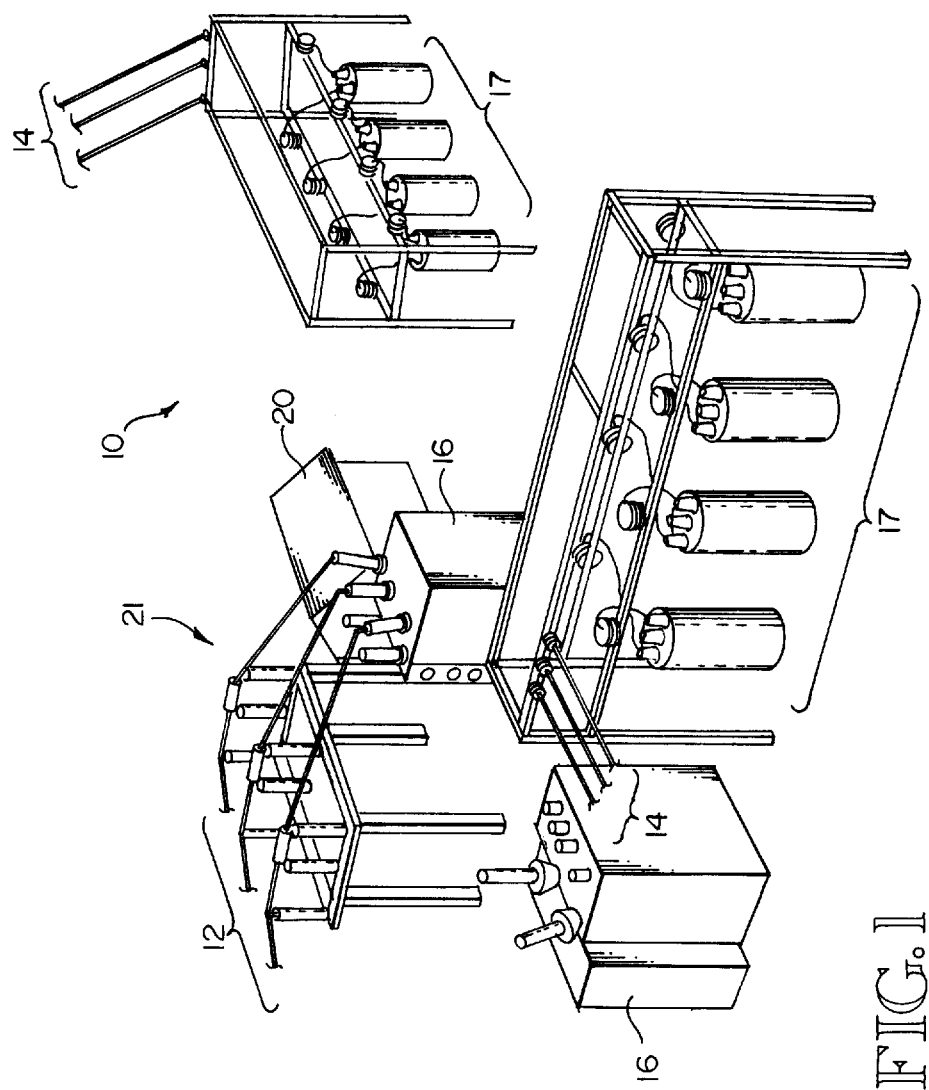
FIG. 1 is a general view of a conventional electric power substation.

FIG. 1 shows a very simplified, schematic view of the various major elements of a representative electric power substation arrangement or layout, which will be used for the explanation of the invention. It should be understood that electric power substations can vary significantly in their arrangements, depending upon the geographical area in which they are located, the parameters of the particular power system of which they are a part, and whether they are a "local" distribution substation or a high voltage transmission substation.

Generally, however, the example substation shown at 10 will include three-phase high voltage lines 12 (2.4–765 kilovolts) coming into the substation and three-phase outgoing feeder lines at 14 (2.4–765 kilovolts) to the particular portion of the overall power distribution system the substation 10 is intended to serve. Substation 10 may include a plurality of voltage transformers 16—16 in the substation yard (outdoor) which will produce a reduction in the voltage level from the incoming high voltage line. Feeder line regulators 17 may also be present, along with feeder line circuit breakers. Further, in some applications, the yard will include large capacitor banks (not shown), each of which may include 100 or more individual capacitors. Such large capacitor banks are a part of high voltage transmission substations. Further, the substation will include various switch gear, including disconnect switches 21.

Still further, the substation may include an enclosed control center 20 (control house) which includes a number of protective relays and a variety of other indicators for determining substation operation.

In general, a substation includes sophisticated and expensive systems for monitoring, reducing and switching a high incoming voltage on one or more power lines (three phases each), as well as sophisticated monitoring and relay apparatus for indicating the operational status of the system, including specifically the monitoring of voltage and current levels on the feeder lines which proceed from the substation ultimately to the customers.

While, as indicated above, the present invention is explained in the context of the substation of FIG. 1, it should be understood that the actual configuration and arrangement of a substation for which the present invention is useful may vary widely. Further, it should be understood that the present invention is useful in a variety of electric power generating situations, including power transmission and distribution systems, and electric power facilities such as substations, switch yards and other similar control facilities.

In the present invention, various operating elements and indicators present in a typical substation environment (or other electric power control situation) are monitored by an image-capturing means, such as a camera. This can be done both inside of the substation control house 20 or outside in the substation yard. A plurality of cameras will typically be used, both indoor and outdoor, although it is possible that the system could include only a single camera, to monitor a select few indicators. The captured image could be in the form of a series of still photographs, or a slow-scan television video, or a full-speed video at 30 or more frames per second. The camera can be fixedly mounted or it can be mounted so as to scan or pan over a selected area, i.e. between selected indicators.

While the primary embodiment described herein includes a camera which acquires visual images of various indicators, it should be understood that other sensing devices could be used, either alone or to supplement the visual camera images. This could include microphones to capture sound, as well as infrared or RF sensors to acquire infrared or RF information from various elements or devices. The visual information, however, is likely to be the most important sensing information in the system.

Inside the control house 20, there are a number of indicators typically present which can be the subject of visual monitoring. As indicated above, all such control houses include a variety of protective relays, both electromechanical and digital. Only one relay is shown for illustration in FIG. 2; however, it should be understood that a typical control house might include a total of 20–100 relays, both electromechanical and digital, mounted in panels. These relays typically have visual operation indicators, in either the form of small lights or mechanical targets released into a viewing window by relay operations. These illuminated targets can be the subject of visual monitoring. In addition, there are various meters and gauges which are connected to appropriate elements or devices in the control house for readout of current, voltage, power, temperature and pressure values, among others. Switch positions can be ascertained and clocks can be monitored. In addition, the status of indoor circuit breakers, lamps and controls for outdoor circuit breakers can be monitored.

FIG. 2 shows a few representative control house, i.e. indoor, indicators along with camera 40 for illustration. In a portion of one particular panel switchboard 46, for instance, could be located a protective relay 49 having one or more visual indicators 51. Meter 47 could be a gauge for current, voltage, power, temperature or other information. Elements 48 and 50 are indicating lamps (open, monitor, close positions) and a control/operating handle for an outdoor circuit breaker, respectively. The camera will capture the position of the handle as well as the status of the indicator lights. In addition to the lamp being illuminated/not illuminated, the lamps may have different colors when lit, which produces additional discrimination capability.

The visual monitoring system of the present invention can thus take advantage of color changes in selected operating elements as well in determining status of various indicators. Element 52 in FIG. 3 is an indoor circuit breaker, with a handle 54 and a target light 56. The indoor circuit breaker 52 may also have setting plugs 58 for convenient setting of operational parameters.

The above explanation relative to possible indicators which may be found in a substation control house 20 is intended to be representative only of the various indicators which could be present in the control house. Further, as indicated above, in addition to obtaining visual images, the present invention can utilize other types of sensors, including microphones. For instance, a microphone can be used to capture alarm signals and/or the particular sounds circuit breakers or other components make during operation. Further, IR (infrared) and RF information from various devices can be compared at intervals, with significant changes being an indication of a change in operation of a particular device.

With respect to outdoor indicators, these could also include a variety of operating elements, including switches, circuit breakers, transformers and capacitor banks, among others. With respect to circuit breakers, the status of the breaker itself and its operation can be observed, as well as breaker contact-state indicators, operation counters and the status of the breaker motors. With respect to transformers, pressure, temperature and oil gauges could be viewed, as well as operation of particular components such as the transformer fans, to ensure actual operation. Tap changer switches can be viewed, as well as the indicators of tap position. With respect to capacitor banks, blown fuses can be detected as well as bulging capacitor cans. Mechanical deflection of bus bars in the yard can also be observed.

FIG. 3 shows the use of two cameras 60 and 62 used to view an outdoor transformer 64. Instead of two cameras, a single camera can be used with mirrors in order to properly view the complete transformer. With respect to the transformer itself, the image monitoring system can look at the operation of cooling fans 66 as well as the oil levels in the sight glasses 68 on the individual transformer bushings 69. A drop in the oil level can be seen directly by the system of the present invention. At the present time, there is no easy way for detecting the status of the oil level in the sight gauges on the transformer bushings There may be other gauges or indicators on the transformers as well.

Outdoor capacitor banks (not shown) can also be looked at, to determine the status of the capacitor fuses, as well as the physical condition of the capacitor cans themselves, for bulges or even ruptures. The detection of a single bad capacitor or one blown fuse is difficult with current systems, but even one bad capacitor can have a significant negative impact on the operation of the capacitor bank as a whole.

Figure 4:
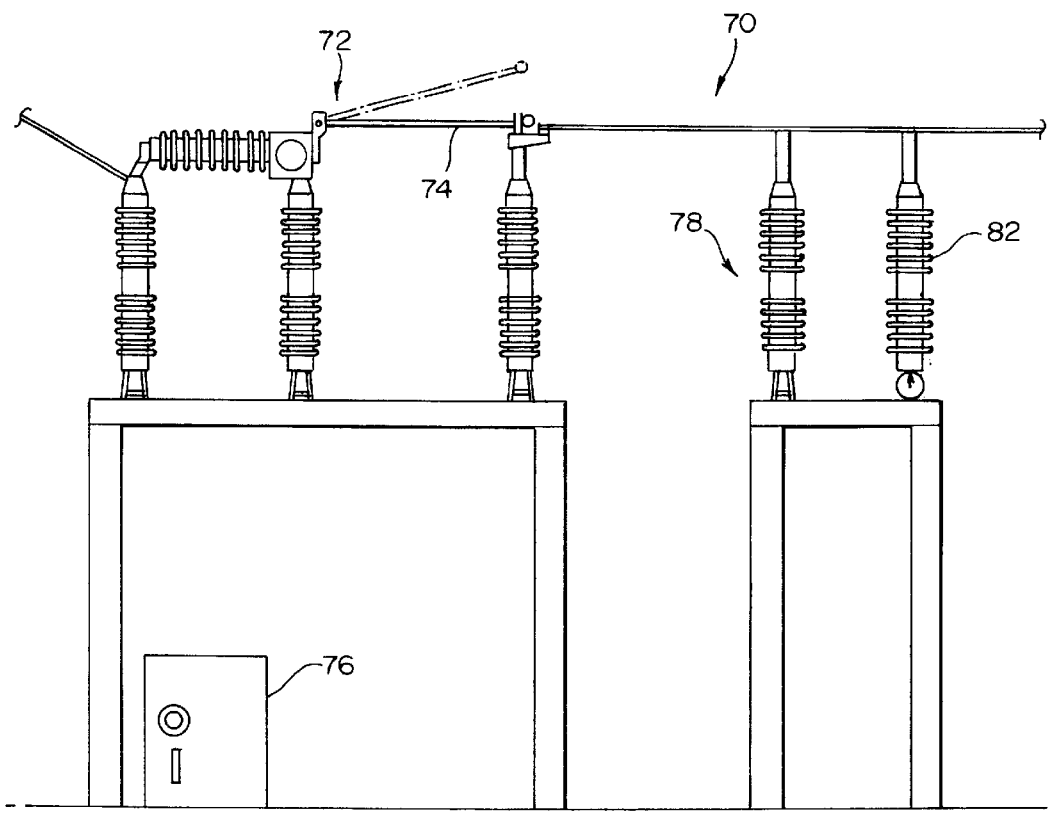
FIG. 4 shows a second aspect of the outdoor monitoring functions of the present invention.

FIG. 4 shows another aspect of outdoor power system substation apparatus which can be monitored by the present invention. High voltage switch gear is shown generally at 70. The scene is viewed by a camera 71. Element 72 is a circuit switcher apparatus. The position of switch arm 74 of the circuit switcher can be readily determined by the visual image means of the present invention. Cabinet 76 contains the controls for the circuit switcher. Various visual elements associated with the cabinet can be monitored, including the position of the control handle and the presence or absence of security tags or locks on the cabinet.

In addition, FIG. 4 shows a grounding switch 78 and a surge counter 80, which are located on a lightning arrester apparatus 82. The monitoring system of the present invention can read the number of surges which are indicated on the counter 80.

Hence, the status of the outdoor switchgear, including the specific position of switch arms as well as the status of various other indicators, can be conveniently monitored by the system of the present invention.

Figure 5:
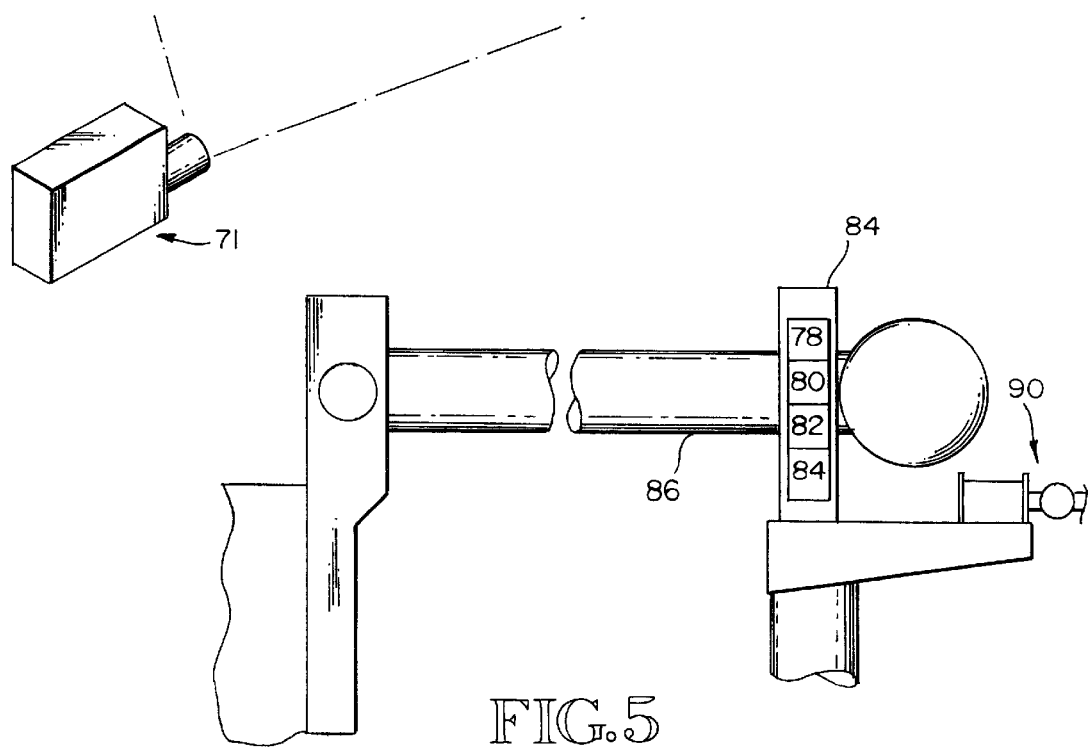
FIG. 5 shows an example of a new monitoring device made practical through use of the present invention.

In addition to the above-described existing monitoring aspects of control house and outdoor (yard) indicators, other sensing devices become practical for use in a substation. FIG. 5 shows one such sensor, as an example. Referring to FIG. 5, element 86 is one contact of a disconnect switch, while element 88 is an LCD temperature-detecting strip (thermometer). The monitoring system of the present invention is capable of reading the temperature of the switch contact, as detected by the thermometer. Element 90 is a fault indicator, with a target. The monitoring system is also capable of reading the fault-indicating target. Such so-called "observational" sensors/transducers (such as temperature indicators) provide significant information, and are relatively inexpensive when observed directly, compared with transducers which convert temperature information into electrical signals.

Particular sensors and/or various indicators could also be designed so that the visual aspects of their operation are enhanced. For instance, marks and/or scales can be used on switch gear or other devices to more readily measure deviations from a nominal position. This could be done, for instance, with switches to determine to what extent the switch is open or closed. Further, contrast detail could be added to particular parts of various indicators to increase their visual distinctiveness, including the use of distinctive colors.

Other devices which measure a selected physical property in terms of visual information, such as the LCD thermometer described above, which changes color at different temperature points, depending upon the temperature exposed to the LCD, can be conveniently used with the present invention. Such a device could be applied to transformer banks, bus bars and other conductors where temperature sensing is desirable.

Still further, bar codes or other kinds of labeling could be used to more specifically identify certain apparatus or indicators so as to simplify the connection between each indicator and its function in the overall protective/monitoring system.

FIG. 6 is a block diagram showing the processing steps which take place in the monitoring system of the present invention. The camera 94 first acquires the indicator image, which is then digitized by a conventional digitizer 96. This digital information may be temporarily stored for processing or may be saved in long-term storage at 98. These initial image acquisition and digitizing steps are shown collectively at block 100.

Once the image has been acquired and digitized, it is then enhanced, as shown at block 102. In this process, noise on the image is reduced, any edges in the image are sharpened, and the image contrast is enhanced. This enhancement process is accomplished by filtering the basic data. Various filters which could be used include a median filter, a contrast enhancement filter, or a histogram stretching or histogram equalization filter.

In the next step, shown at block 108, the particular desired features in the enhanced image are detected, as shown at block 104. These include edge, corner and circle detection. A Robert operator, Sobel operator, Cross operator or Diamond operator (all well-known edge enhancement techniques) can be used for detecting edges oriented in any direction, while horizontal, vertical, left diagonal and right diagonal operators detect edges in the specified direction. A Hough transform is used for detecting a circle. Following this step, the features of the various objects in the image will have been clearly defined.

In the next step, actual data will be extracted from the information in the image to identify the positions of various control elements, such as arms and switches. The extraction of data includes a determination of whether particular target lights are on or off, the position of switches and actual gauge and meter values.

In the next step, shown at block 112, calculations are performed on the extracted data against specified thresholds. A decisional result from this step, providing information in a logical data coded format, concerns the condition of the switches, lights, etc. in the image relative to the standard or threshold value. In essence, this step makes an automatic determination as to whether any corrective action is required.

Next, in block 114, the resulting data, in the form of messages, may be transmitted to a system control unit or other similar apparatus through a communication interface 116. Further, the data can be applied to control outputs, as appropriate, at 118, such as output contacts, which are then used in conventional fashion to open a circuit breaker or accomplish other selected action. The resulting data can be recorded using any one of various storage media.

Further with respect to any corrective action, the control contacts can be used to control a robot-like apparatus at the substation which can accomplish certain selected corrective action, such as with circuit breakers, switches, or other kind of action.

All of the above results in a more detailed, comprehensive monitoring of substation activity, without the need of a human operator. Any activity concerning particular equipment which is visual in nature can be observed. This can include the possibility of flashovers or arcing of components during switching, or the possible start of a fire due to a component, and/or the speed of operation of items like switches, in addition to their final position. With direct visual information, the use of expensive transducers can be eliminated and/or substantially reduced, thus reducing overall cost.

Still further, when visual monitoring (including the ability to scan) is combined with aural monitoring and possibly RF and infrared monitoring as well, an effect similar to virtual reality can be accomplished for a particular substation for personnel at a remote site.

Hence, a system has been described which results in comprehensive monitoring of an electric power substation through direct visual imaging of a plurality of different indicators in the substation which are representative of substation operation.

Although a preferred embodiment of the invention has been disclosed herein for illustration, it should be understood that various changes, modifications and substitutions may be incorporated in such embodiment without departing from the spirit of the invention, which is defined by the claims which follow.

What is claimed is:

1. A system for visually monitoring the state of various operational indicators present in an electric power control or monitoring environment, including a substation, comprising:

means for obtaining an image of the status of a plurality of operational indicators in said electric power control or monitoring environment, wherein said image-obtaining means is positioned in a control house portion of the substation, aimed at indoor targets which include said operational indicators;

means for processing the image so as to enhance recognition of the status of the operational indicators; and means for comparing the resulting processed image against a preselected standard to determine the state of the operational indicators.

2. A system of claim 1, including means for communicating said indicator state information to a remote location.

3. A system of claim 1, including means for developing a control signal from said comparing means if said indicator state is out-of-tolerance, said control signal being suitable for initiating corrective action.

4. A system of claim 3, wherein said corrective action is tripping a circuit breaker.

5. A system of claim 3, including a robot means responsive to said control signal for accomplishing said corrective action.

6. A system of claim 1, wherein said image-obtaining means is a camera.

7. A system of claim 1, wherein said indoor targets include gauges, protective relay target lights and circuit control switches.

8. A system of claim 1, including means for moving the camera between targets.

9. A system of claim 1, including means for illuminating the targets.

10. A system of claim 1, including means for visually enhancing the target so as to make said targets easier to recognize.

11. A system of claim 1, wherein image obtaining means are located both in a control house portion of the substation, aimed at indoor targets and in a substation yard, aimed at outdoor targets.

12. A system of claim 1, wherein the processing means includes means for digitizing the obtained image, means for enhancing the image, and means for detecting the features of the operational indicators within the image.

13. A system of claim 1, including means for obtaining sensory information in addition to the image information.

14. A system of claim 13, wherein said sensory information is auditory information.

15. A system of claim 13, wherein said sensory information is infrared information associated with the operation of a selected operational indicator.

16. A system of claim 13, wherein said sensory information is radio frequency information associated with the operation of a selected operational indicator.

17. A system for visually monitoring the state of various operational indicators present in an electric power control or monitoring environment, including a substation, comprising:

means for obtaining an image of the status of a plurality of operational indicators in said electric power control or monitoring environment, wherein said image-obtaining means is aimed at outdoor targets containing said operational indicators within a substation yard;

means for processing the image so as to enhance recognition of the status of the operational indicators; and means for comparing the resulting processed image against a preselected standard to determine the state of the operational indicators.

18. A system of claim 17, wherein said outdoor targets include transformers, capacitor banks and switchgear.

19. A system of claim 17, including means for moving the camera between targets.

20. A system of claim 17, including means for communicating said indicator state information to a remote location.

21. A system of claim 17, including means for developing a control signal from said comparing means if said indicator state is out of tolerance, said control signal being suitable for initiating corrective action.

22. A system of claim 21, including a robot means responsive to said control signal for accomplishing said corrective action.

23. A system of claim 17, wherein said image-obtaining means is a camera.

24. A system of claim 17, including means for illuminating the targets.

25. A system of claim 17, including means for visually enhancing the targets so as to make said targets easier to recognize.

26. A system of claim 17, wherein the processing means includes means for digitizing the obtained image, means for enhancing the image, and means for detecting the features of the operational indicators within the image.

27. A system of claim 17, including means for obtaining sensory information in addition to the image information.

* * * * *